H. HAAS.
CLOTH SHEARING MACHINE.
APPLICATION FILED JAN. 25, 1915.
1,147,088.
Patented July 20, 1915.
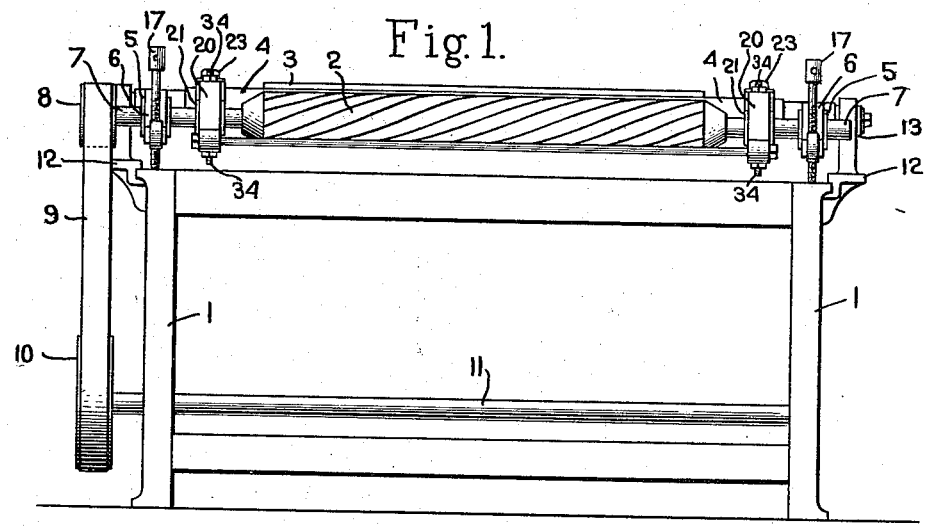
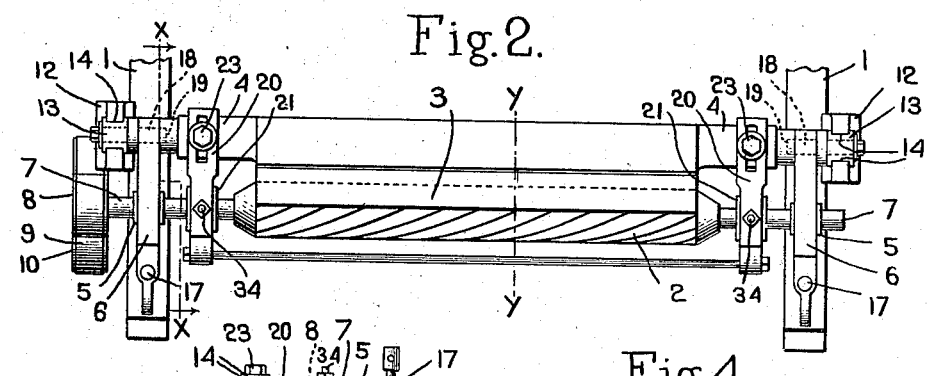
Witnesses.
J. Morrill Fuller
William E. Gagen
Inventor.
Hermann Haas,
by Heard Smith & Tennant
Att'ys.

UNITED STATES PATENT OFFICE.

HERMANN HAAS, OF LENNEP, GERMANY.

CLOTH-SHEARING MACHINE.

1,147,088. Specification of Letters Patent. Patented July 20, 1915.

Application filed January 25, 1915. Serial No. 4,115.

*To all whom it may concern:*

Be it known that I, HERMANN HAAS, a subject of the Emperor of Germany, residing at Lennep, Empire of Germany, have invented an Improvement in Cloth-Shearing Machines, of which the following description, in connection with the accompanying drawing, is a specification, like characters on the drawing representing like parts.

This invention relates to cloth-shearing machines of that type embodying a rotary spiral cutting member and a stationary ledger blade coöperating with the rotary member, and the object of the invention is to provide a novel construction by which any wear which may occur in the bearings of the rotary spiral member will not cause a change in the relative positions of the rotary member and ledger blade.

In the operation of cloth-shearing machines of this type, the strain of the driving belt is apt to cause the bearings for the rotary shearing member to become worn and where the ledger blade is fixed in position, any change of position of the rotary shearing element due to wear in the bearings will cause a change in the relative positions of the cutting edges of the rotary element and ledger blade. Any such change in relative position will, of course, affect the shearing operation, for if the bearings wear in such a way that the rotary shearing member is separated slightly from the shearing edge of the ledger blade, then, of course, the two members will not properly coöperate.

It is the object of my invention to provide a novel support for the ledger blade and the rotary shearing member so that any variation in the position of the rotary member due to wear of the bearings will not affect the relative position of the two shearing elements.

In order to give an understanding of my invention I have illustrated herein a selected embodiment thereof which will now be described, after which the novel features will be pointed out in the appended claims.

In the drawings Figure 1 is a front view of a cloth-shearing machine embodying my invention; Fig. 2 is a plan view of Fig. 1; Fig. 3 is a side view; Fig. 4 is a section on the line $x$—$x$, Fig. 2; Fig. 5 is a section on the line $y$—$y$, Fig. 2.

1 designates the frame on which the shearing members are mounted.

2 is the rotary shearing member having spiral blades, and 3 is the ledger blade which coöperates with the rotary member, as usual in cloth-shearing machines, said ledger blade being secured to a carrier 4. The rotary member 2 is mounted in suitable bearings 5 formed in bearing members or brackets 6 that are sustained on the sides of the frame 1, the shaft 7 of said rotary member having a pulley 8 thereon over which passes a driving belt 9, the latter being driven from a driving pulley 10 on a driving shaft 11. With this arrangement the strain of the belt will tend to wear the lower portions of the bearings, and as the bearings wear the rotary shearing member 2 will, of course, be displaced downwardly.

The brackets or bearing members 6 are herein shown as provided at their rear ends with boxes 13 which are movable vertically in ways 14 formed in guide members 12 secured to the sides of the frame. These boxes are retained in their adjusted positions by means of the adjusting screws 15. The front ends of the brackets or bearing members 6 are provided with the adjusting screws 17 which rest on the frame and by which the brackets can be adjusted vertically.

The carrier 4 for the ledger blade is supported at its rear edge from the brackets 6, and a connection is provided between said ledger blade and the shaft of the spiral cutting element 2 so that the proper relative position between the cutting edge of the ledger blade and the rotary shearing element 2 will be maintained in all adjusted positions of the rotary element.

As herein shown the brackets 6 are provided with trunnions 18 which enter recesses 19 formed in the ends of the carrier 4, and the carrier has secured to each end thereof an arm or bracket 20, each arm or bracket carrying a bearing 21 through which the shaft 7 of the rotary element extends. These arms or brackets 20 are secured to the carrier 4 in any suitable way as by means of bolts 23. The arms or brackets 20 will maintain the ledger blade 3 and rotary shearing element 2 in fixed relation to each other, and this relation will not be changed by any vertical adjustment of the rotary element 2, for as the latter is adjusted vertically the arms or brackets 20 will turn the carrier 4 about the trunnions and keep the shearing edge of the ledger blade in proper operative relation to the spiral blades of the rotary shearing member 2. When the spiral blades of the rotary shearing member 2 are to be ground, the brackets or bearing members 6 can be removed, and during the grinding operation the shaft 7 will operate in the bearings 21 which may be supported directly on the machine in any suitable way.

The bearings 21 are shown as adjustably mounted in the brackets or arms 20 so as to provide for adjusting the shearing edge of the ledger blade 3 toward and from the cutting edge of the spiral shearing member 2. This adjustment is herein shown as provided for by means of adjusting screws 34 carried by the bracket 20 and engaging the bearing block 21.

While I have illustrated herein a selected embodiment of my invention I do not wish to be limited to the constructional features shown.

I claim:

1. In a cloth-shearing machine, the combination with a frame, of a rotary spirally-bladed shearing element, bearings therefor sustained by the frame, a ledger blade, a carrier therefor, and means connecting said carrier to the shaft of the rotary shearing member to maintain the shearing edge of the ledger blade always in predetermined position relative to the rotary element.

2. In a cloth-shearing machine, the combination with a frame, of bearing members sustained thereby, a rotary spirally-bladed shearing member operative in said bearings, a carrier movably sustained by the bearings, a ledger blade secured to the carrier, and arms or brackets fastened to the carrier and having engagement with the rotary shearing element to maintain the ledger blade always in correct position relative to the rotary shearing element.

3. In a cloth-shearing machine, the combination with a frame, of bearing members sustained thereby, a rotary spirally-bladed shearing member operative in said bearings, a carrier movably sustained by the bearings, a ledger blade secured to the carrier, and arms or brackets fastened to the carrier and having bearings in which the rotary shearing element revolves, said arms maintaining the cutting edge of the ledger blade in proper operative position relative to the rotary shearing element.

In testimony whereof, I have signed my name to this specification, in the presence of two subscribing witnesses.

HERMANN HAAS. [L. S.]

Witnesses:
 HELEN NUFER,
 ALBERT NUFER.

Copies of this patent may be obtained for five cents each, by addressing the "Commissioner of Patents, Washington, D. C."